United States Patent [19]
Busquets

[11] Patent Number: 5,327,990
[45] Date of Patent: Jul. 12, 1994

[54] INTEGRAL AUTOMATIC SYSTEM FOR PROTECTION AND RESCUE OF OCCUPANTS IN CRASHED AUTOMOBILES

[76] Inventor: Albert B. Busquets, Matilde Diez 12, 08006-Barcelona, Spain

[21] Appl. No.: 5,860

[22] Filed: Jan. 13, 1993

Related U.S. Application Data

[63] Continuation of Ser. No. 800,883, Nov. 27, 1991, abandoned, which is a continuation of Ser. No. 524,542, May 16, 1990, abandoned.

[30] Foreign Application Priority Data

May 16, 1989 [ES] Spain .................................. 8901647

[51] Int. Cl.$^5$ .................... B60K 28/00; B60R 21/00
[52] U.S. Cl. ............................ 180/271; 180/279; 180/284; 280/735; 307/10.1
[58] Field of Search .............. 280/735; 180/268, 271, 180/274, 279, 281, 282, 283, 284; 307/10.1

[56] References Cited

U.S. PATENT DOCUMENTS

| | | | |
|---|---|---|---|
| 3,177,966 | 4/1965 | Schoeffler et al. | 180/268 |
| 3,743,849 | 7/1973 | Iwata | 180/279 X |
| 4,014,565 | 3/1977 | Fieni | 180/268 X |
| 4,381,829 | 5/1983 | Montaron | 180/274 |
| 4,553,625 | 11/1985 | Tsuge et al. | 180/268 |
| 4,678,928 | 7/1987 | Nishimura et al. | 180/282 |
| 4,694,928 | 9/1987 | Barton et al. | 180/268 |
| 4,785,907 | 11/1988 | Aoki et al. | 180/281 |

FOREIGN PATENT DOCUMENTS

| | | | |
|---|---|---|---|
| 2463028 | 3/1981 | France | 180/268 |
| 63-159147 | 7/1988 | Japan | 180/274 |
| 515950 | 12/1939 | United Kingdom | 180/274 |
| 2069587 | 8/1981 | United Kingdom | 180/274 |

Primary Examiner—Margaret A. Focarino
Assistant Examiner—Paul Dickson
Attorney, Agent, or Firm—Lackenbach Siegel Marzullo Aronson & Greenspan

[57] ABSTRACT

An integral automatic system for the protection and rescue of occupants in crashed automobiles comprising an aggregate of mechanical and electrical elements connected to an electronic central control unit, incorporated within the vehicle. The control unit is in turn connected to an impact-operated battery disconnector of high breaking power which will initiate the cycle of partial disconnection of circuits and initiate timed commands, such as the activation of an electrovalve for shutting off the fuel, locking of the ignition coil contact and others, including electric opening of the windows, centralized opening of the doors, and disengagement of the seat belts from their anchors. The system is intended to prevent risks that may arise after an accident takes place and also facilitates the extraction of the occupants from the crashed vehicle.

2 Claims, 1 Drawing Sheet

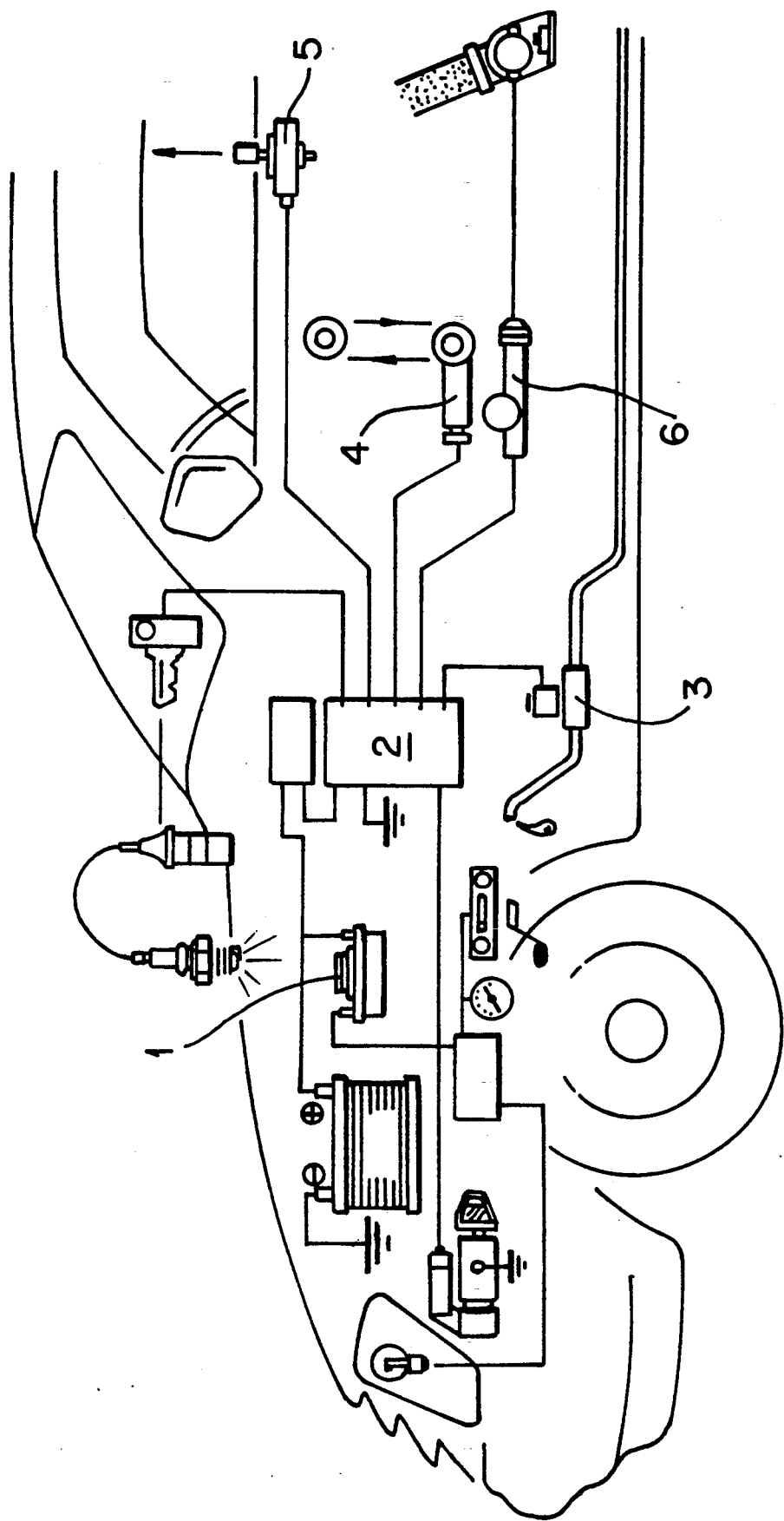

INTEGRAL AUTOMATIC SYSTEM FOR PROTECTION AND RESCUE OF OCCUPANTS IN CRASHED AUTOMOBILES

This application is a continuation of application Ser. No. 800,883, filed Nov. 27, 1991, abandoned which was a continuation of application Ser. No. 524,542 filed on May 16, 1990, abandoned.

BACKGROUND OF THE INVENTION

This invention relates to an integral automatic system for protection and rescue of occupants in crashed automobiles.

Although automotive technology constitutes a complex and very widely developed field in which revolutionizing novelties rarely occur, there are numerous advances that are made gradually, because, among other reasons, the manufacturing volumes and the investments required to introduce said changes do not permit doing it in any other way. One of the outstanding trends in today's automotive industry aims to diminish the severity of traffic accidents caused by collisions of any kind, overturning, etc.

The current state of technology has adopted various solutions intended to reduce the damage caused by the collision and by the projection of the occupants against the structure of the cabin. It is known that it is beneficial to place masses in front of the seats, such as the engine of the vehicle. Proven also is the effectiveness of the use of safety belts which, combined with the use of automatically inflating balloons, constitute means proven to be useful in a considerable percentage of accidents, including those caused by lateral shocks. Also, the new safety requirements take into account the risk created by skidding of the wheels when braking, making use of the principle of measuring the angular deceleration of the wheels to moderate the braking torque so that the wheel will not block.

All these methods, in which the present state of the art can be encompassed generally, are aimed specifically at reducing the intensity of the accident and protecting the driver and occupants from the immediate damage produced by the shock and by the series of impacts set off by it. In the present state of the art there are no means aimed at preventing risks that may arise after the accident is fully over or means that facilitate extraction of the occupants. It is this gap that the system of the present invention seeks to bridge, the novelty of which resides in providing means designed to bring about the activation or joint and progressive cancellation of a series of functions by inclusion of new devices, such as an impact sensor which is actuated at high impact levels, an electronic central control unit, a device for releasing the belts from their anchor, upon actuation by an electrical signal and the incorporation of an electrovalve with an interlock for shutting of the passage of fuel from the tank to the fuel pump upon actuation by an electrical signal.

Besides these devices, other conventional ones can be utilized, such as the electrically actuated centralized locking and unlocking of doors and the electrically operated window lift system.

SUMMARY OF THE INVENTION

By properly connecting all these devices in circuit with the central control unit, the latter will properly and quickly reverse or cancel various functions as a protective measure.

After the accident is fully over, the locking or securing of doors, which is a safety measure while driving, becomes a danger; the tight seal of the windows constitutes another danger from that time on; the presence of current flow in the circuits could also turn out to be very dangerous and unnecessary as is also the probable spilling of fuel; lastly, the safety belts become a great hinderance after their mission is fulfilled. Once these functions have been canceled or reversed, the central control unit disconnects itself and in the end all circuits are absolutely without current flow, free from fuel, and with the automatic opening of windows, doors and safety belts, extraction of the occupants is facilitated so as to attend to them properly.

BRIEF DESCRIPTION OF THE DRAWING

To facilitate the explanation, a sheet of drawings is attached hereto in which a case of realization cited by way of example is represented.

In the drawings, the one and only FIGURE represents a partial schematic view of a motor vehicle equipped with the system of the invention.

DESCRIPTION OF THE PREFERRED EMBODIMENT

The system consists of an aggregate of mechanical and electrical elements connected to an electronic central control unit, designated by 2, and the latter in turn to an impact sensing and disconnector means, designated by 1, of high breaking power which is actuated at a high impact level and which will take care of initiating the cycle. The system further comprises the following devices: A fuel electrovalve 3, with interlock; a contact maker of conventional type; electric window lifts 4, conventional; centralized locks 5, of conventional type; and a delayed safety belt releasing device 6.

The system consists of an aggregate of mechanical and electrical elements connected to an electronic central control unit which, as a result of a shock of high impact detected by an impact sensing and disconnector means 1, will cause the opening and closing of its contacts so that in addition to disconnecting some circuits from the battery, it will transmit a signal which will activate the electronic central unit 2, and the latter will take care of distributing a series of commands in a delayed and progressive manner to some devices, commonly present in any current automobile, such as electric windows lifts 4, centralized locks 5, and other new devices incorporated in the whole, such as the delayed safety belt release device 6. The functions will be carried out progressively, aimed at protecting the occupants after the impact, avoiding toxic fumes and even fire, which is achieved by reversing or canceling all or part of the functions of the usual elements necessary in normal running, but which become unnecessary and dangerous after the accident has taken place and which moreover create great problems for the extraction of or aid to the occupants.

What is claimed is:

1. In an automobile having one or more security systems, including seat belts, air bags and an anti-skid braking system, and having a plurality of electrically controllable devices which are in predetermined states of operation during normal use of an automobile, which predetermined states may be hazardous to the occupants of the automobile upon the occurrence of an accident, including electric window drives, door locks, fuel valve, seat belt locks which are in circuit with the battery of the automobile, an improved system to increase the safety and facilitate the prompt rescue of automobile occupants which comprises an impact-operated sensing and electrical disconnector means mounted on said automobile; and a single, master central control unit mounted on said automobile;

said impact-operated disconnector means and said single, master central control unit being in circuit with said battery, said central control unit also being in circuit with said plurality of electrically controllable devices; and said system being characterized in that the occurrence of a crash will cause the impact sensing and disconnector means to activate the central control unit and initiate the distribution of a series of commands in a progressive manner after a predetermined delay to at least more than one of said plurality of electrically controllable devices to cancel at least part of said predetermined states of said at least more than one of said plurality of electrically controllable devices to enhance the safety of and facilitate the rescue of the automobile occupants following impact.

2. The improved system in accordance with claim 1, wherein upon activation of said central control unit, said central control unit further provides an electrical signal to shut off the fuel valve.

* * * * *